United States Patent Office 3,849,374
Patented Nov. 19, 1974

3,849,374
STORAGE STABLE MIXTURES OF BIS OR TRIS IMIDES AND POLYAMINES
Alfred Renner, Munchenstein, and Theobald Haug, Frenkendorf, Switzerland, assignors to Ciba-Geigy Corporation, Ardsley, N.Y.
No Drawing. Filed July 20, 1973, Ser. No. 381,327
Claims priority, application Switzerland, Oct. 10, 1972, 14,886/72
Int. Cl. C08g 20/32
U.S. Cl. 260—47 CP
8 Claims

ABSTRACT OF THE DISCLOSURE

Mixtures which can be cured to give moulded materials having technically very valuable mechanical and dielectric properties, characterised in that they contain (a) bis- and/or tris-imides, containing a phosphate or thiophosphate group, of certain unsaturated dicarboxylic acids, such as maleic acid, dimethylmaleic acid, citraconic acid or itaconic acid, (b) diamines and/or polyamines and optionally (c) a curing catalyst.

---

The present invention relates to new, thermosetting mixtures of phosphorus-containing N,N' - bis - imides or N,N',N''-tris-imides of certain unsaturated dicarboxylic acids and compounds which contain at least 2 primary amino groups in the molecule, and to a process for the manufacture of moulded materials from these thermosetting mixtures.

U.S. Patent Specification 2,818,405 describes the manufacture of elastomers of phosphorus-free bis-maleimides and certain long-chain amines having a molecular weight between 750 and 12,000. However, these curable mixtures are less suitable for the manufacture of, for example, compression moulding compositions or laminates; furthermore, the heat resistance of the moulding compositions or coatings manufactured therefrom is not particularly pronounced.

French Patent Specification 1,555,564 furthermore describes the manufacture of thermosetting products of phosphorus-free N,N'-bis-imides of certain unsaturated dicarboxylic acids and di-primary diamines. It was to be expected that the moulded materials obtained from the new thermosetting mixtures according to the present invention would be less inflammable, because of their phosphorus content, than the moulded materials according to the French patent specification. Because of the higher density of crosslinking in the mouldings manufactured according to the invention, which are based on a N,N',N''-tris-imide, products of poorer mechanical properties would have been expected; for example, such mouldings should be more brittle. Surprisingly, however, the mouldings obtained from the curable mixtures according to the invention, including those based on N,N',N''-tris-imides, are distinctly less brittle and have a distinctly higher flexural strength than the products according to the French patent specification. The moulded materials obtained from the mixtures according to the invention furthermore attain these advantageous properties after substantially shorter curing times and without the use of pressure during moulding and curing.

For certain applications, the new curable mixtures have a further advantage since the bis-imides and tris-imides contained in the curable mixture are readily soluble in dioxane, in contrast to the imides principally used in French Patent Specification 1,555,564.

Numerous attempts to reduce the inflammability of moulded materials by adding substances containing phosphorus in general lead to an unfavourable effect on the electrical properties, because of the increased action of water on the mouldings. It was therefore surprising that the electrical properties of the mouldings according to the invention hardly deteriorate if the material is kept in water.

Hence, the invention relates to new, storage-stable, thermosetting mixtures which are characterised in that they contain (a) bis-imides or tris-imides, containing a phosphate, thiophosphate or phosphite group, of the general formula I

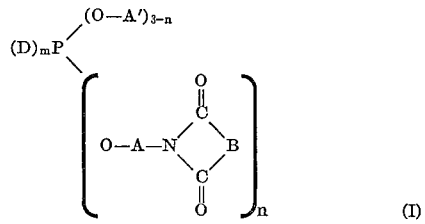

in which A and A' denote aromatic radicals which are optionally substituted or interrupted by an oxygen atom, an alkylene group or a sulphonyl group, B denotes a radical of the formulae

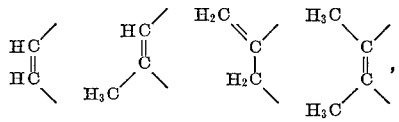

D denotes an oxygen atom or sulphur atom, $m$ denotes the number 1 or 0 and $n$ denotes the number 2 or 3, (b) a polyamine of the formula II or III $$E(NH_2)_n \qquad (II)$$

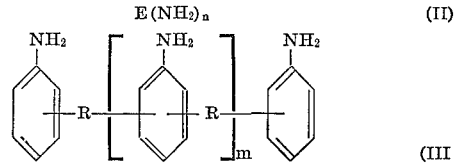

wherein, in the formula II, the radical E denotes an n-valent organic radical with 2 to 40 carbon atoms and $n$ represents an integer from 2 to 4, and wherein, in the formula III, the radicals R each denote a divalent hydrocarbon radical of an aldehyde or ketone with 1 to 8 carbon atoms resulting from removal of the oxygen atom and $m$ represents a number from 0.1 to 2 and optionally (c) a curing catalyst.

Preferably, the mixtures according to the invention consist of (a) bis-imides or tris-imides of the formula I, in which A and A' denote identical or different aromatic radicals with 6 to 12 carbon atoms, B denotes the vinylene radical and $m$ denotes 0 or 1, and
(b) di-primary or tri-primary polyamines of the formula II, wherein E denotes an organic radical with 2 to 40 carbon atoms.

In the compounds of the formula I, the aromatic radicals A and A' can be substituted by groups or atoms which do not interfere with the course of the reaction during the manufacture of the imides. As examples of such there may be mentioned linear or branched alkyl radicals with 1–4 carbon aoms, halogen atoms, the nitro group, the tertiary amino group, the alkoxy group, the carbalkoxy group or the carbamide group.

This bis-imides and tris-imides of the formula I have not previously been described in the literature and are obtained by cyclising dicarboxylic acid monoamide compounds of the gneral formula IV

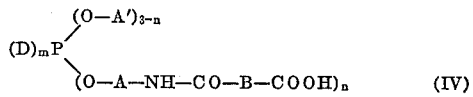

at temperatures below 90° C. in the presence of catalysts, with elimination of $n$ mols of water, and subsequently isolating the compounds of the formula I by precipitating the reaction product in water or in an aqueous alcohol solution. Preferably, acetic anhydride is used as the solvent and sodium acetate as the catalyst in the dehydrating cyclisation.

The dicarboxylic acid monoamide compounds of the formula IV are obtained according to known processes by addition reaction of 1 mol of bis- or tris-(aminoaryl)-phosphate, -thiophosphate or -phosphite of the general formula V

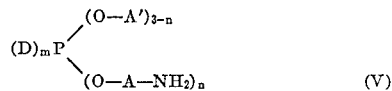
(V)

with $n$ mols of maleic anhydride, citraconic anhydride, itaconic anhydride or dimethylmaleic anhydride.

The aminoaryl compounds of the formula V are obtained analogously to the process described in British Patent Specification No. 1,027,059 by trans-esterification of, for example, triphenylphosphate, triphenylthiophosphate or triphenylphosphite, with aminophenols of the general formula VI $$HO\text{—}A\text{—}NH_2 \qquad (VI)$$

optionally mixed with phenols of the formula VII $$A'\text{—}OH \qquad (VII)$$

the molar ratio of aminophenols of the formula VI to phenols of the formula VII being 2:1 if a phenol mixture is used.

The aminoaryl compounds of the formula V can also be obtained according to the process described in German Auslegeschrift (DAS) No. 1,257,153, by reaction of phosphorus trihalide, phosphoryl trihalide or thiophosphoryl trihalide with the aminophenols of the formula VI, optionally mixed with the phenols of the formula VII, the molar ratio being as indicated above if a phenol mixture is used.

As suitable aminophenols of the formula VI there may be mentioned: m-aminophenol, p-aminophenol, and aminophenols substituted by alkyl groups or chlorine atoms, such as 2-methyl-4-aminophenol or 2-chloro-4-aminophenol. It is furthermore also possible to use polynuclear aminophenols, such as 1,2-aminonaphthol, 1,5-aminonaphthol, 1,6-aminonaphthol, 1,7-aminonaphthol, 2,7 - aminonaphthol, p-hydroxyphenyl-p-aminophenyl-dimethylmethane and p-hydroxyphenyl-p-aminophenyl-sulphone.

As phenols of the formula VII there should in particular be mentioned: phenol, phenol substituted by alkyl groups or halogen atoms, naphthol or naphthol substituted by alkyl groups or halogen atoms.

As bis-imides or tris-imides of the formula I there may be mentioned: the bis-maleimide of 4,4'-diaminotriphenylphosphate, the bis-citraconimide of 4-tert.-butyl-4',4''-diaminotriphenylphosphate, the bis-maleimide of 3,3'-diamino-3''-dimethylaminotriphenylphosphate, the bis-itaconimide of bis-(4-aminophenyl)-bis-phenylylphosphate, the bis-maleimide of bis-(4 - aminophenyl)-2-naphthylphosphate, the tris-maleimide of tris-(4 - aminophenyl)-phosphate, the tris-citraconimide of tris-(4-aminophenyl)-phosphate, the bis-maleimide of 4,4'-diamino-triphenylphosphite, the N,N'-bis-maleimide of diamino-triphenyl-thiophosphate, the N,N',N''-tris-maleimide of tris-(4-aminophenyl)-phosphite and the N,N',N''-tris-maleimide of tris-(4-aminophenyl)-thiophosphate. The bis-maleimide of 4,4'-diaminotriphenylphosphate and the tris-maleimide of tris-(4-aminophenyl)-phosphate, or a mixture of these two, are used preferentially.

The polyamides of the formulae II and III are known compounds.

If the polyamine of the formula II is a di-primary polyamine, the symbol E denotes a linear or branched alkylene radical with fewer than 20 carbon atoms, a phenylene radical, a cyclohexylene radical or a radical of the formula

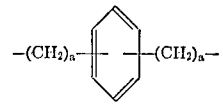

in which $a$ represents an integer from 1 to 3.

The symbol E can also embrace several phenylene or cyclohexylene radicals which are linked directly or via a single valency bond or via an atom or a divalent inert group, such as, for example, oxygen or sulphur atoms, alkylene groups with 1 to 3 carbon atoms or the following groups: —CO—, —SO$_2$—, —NR$_1$—, —N=N—, —CONH—, —COO— and —CONH—E—HNCO—.

Furthermore, the various phenylene or cyclohexylene radicals can be substituted by methyl groups. The symbol E can also represent the grouping

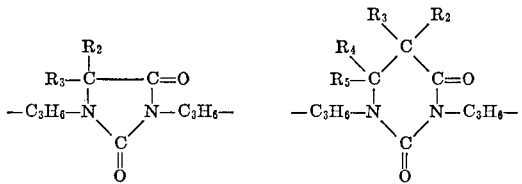

In these formulae, $R_2$, $R_3$, $R_4$ and $R_5$ denote hydrogen or identical or different aliphatic hydrocarbon radicals with 1–6 carbon atoms, and $R_2$ and $R_3$ together with the carbon atom in position 5 can also form a 5-membered or 6-membered aliphatic ring.

As examples of diamines of the formula II there may be mentioned: 4,4'-diamino-dicyclohexylmethane, 1,4-diaminocyclohexane, m-phenylenediamine, p-phenylenediamine, 4,4'-diamino-diphenylmethane, bis-(4-aminophenyl) - 2,2 - propane, 4,4'-diamino-diphenyl-ether, 4,4'-diaminodiphenylsulphone, 1,5 - diamino-naphthalene, n-xylylenediamine, p-xylylenediamine, ethylenediamine, hexamethylenediamine, bis - (γ - aminopropyl) - 5,5-dimethylhydantoin and 4,4'-diaminotriphenylphosphate.

Amongst the polyamines of the formula II which differ from the di-primary polyamines of the formula II, those which have fewer than 40 carbon atoms and possess 3 or 4 NH$_2$ groups per molecules are used preferentially. The NH$_2$ groups can be substituents on an optionally methyl-substituted benzene ring, naphthalene ring, pyridine ring or triazine ring. They can also be substituents on several benzene rings which are linked to one another by a single valency bond, an atom or an inert group, as already mentioned under the di-primary polyamines of the formula II, or can also be linked to one another by one of the following groups

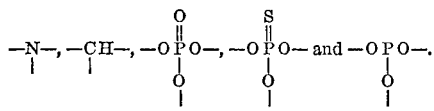

The following may be mentioned as examples of such polyamines: 1,2,4-triaminobenzene, 1,3,5 - triaminobenzene, 2,4,6-triaminotoluene, 2,4,6-triamino-1,3,5-trimethylbenzene, 1,3,7-triaminonaphthalene, 2,4,4' - triaminodiphenyl, 3,4,6-triaminopyridine, 2,4,4' - triaminophenyl-ether, 2,4,4'-triaminodiphenylmethane, 2,4,4'-triaminodiphenylsulphone, 2,4,4' - triaminobenzophenone, 2,4,4'-triamino - 3 - methyldiphenylmethane, N,N,N-tri(4-aminophenyl)-amine, tri - (4 - aminophenyl)-methane, tri-(4-aminophenyl)-phosphate, tri-(4-aminophenyl)-phosphite, tri-(4-aminophenyl)-thiophosphate, 3,5,4' - triaminobenzanilide, melamine, 3,5,3',5'-tetraaminobenzophenone, 1,2,4,5-tetraaminobenzene, 2,3,6,7 - tetraaminonaphthalene, 3,3'-diaminobenzidine, 3,3',4,4' - tetraaminophenyl-ether, 3,3',4,4'-tetraaminodiphenylmethane, 3,3',4,4'-tetraaminodiphenylsulphone and 3,5 - bis - (3,4'-diaminophenyl)-pyridine.

The use of m-phenylenediamine, 4,4'-diaminodiphenylmethane, 4,4' - diamino-diphenyl-ether, Hexamethylenediamine, 4,4' - diamino-triphenylphosphate, tris-(4-aminophenyl) - phosphate, tris-(4-aminophenyl)-thiophosphate, tris-(4-aminophenyl)-phosphite or of a mixture of these is preferred.

The polyamines of the formula III can be obtained according to known processes such as are described, for example, in French Patent Specifications 1,430,977 and 1,481,932 by reaction of primary aromatic amines with aldehydes or ketones.

Examples of aldehydes or ketones used are formaldehyde, acetaldehyde, benzaldehyde, oenanthaldehyde, acetone, methyl ethyl ketone, cyclohexanone and acetophenone.

The ratio in which the imides of the formula I and the amines of the formula II or III are emixed is so chosen that 1–10, preferably 2–5, imide groups are present in the reaction mixture per primary amino group.

The curable mixtures which are stable to storage at room temperature can also consist of several imides of the formula I and several amines of the formula II or III.

The mixtures according to the invention are cured by warming them to temperatures between 100 and 280° C., preferably 150 and 250° C., whereupon the mixtures are converted into crosslinked, insoluble and infusible products without releasing volatile reaction products.

It is also possible first to manufacture a prepolymer from the mixtures according to the invention by heating the homogeneously mixed, optionally finely ground starting materials for a time to 50–140° C. so that a partially soluble product which is still thermoplastic is produced. This prepolymer must, if necessary, again be ground to give a processable powder. The prepolymerisation can also be carried out by heating a solution or suspension of the starting materials. For this purpose, substances can be used which do not react with the starting materials and in which they are sufficiently soluble, if desired. Examples of such liquids are: dimethylformamide, tetramethylurea, dimethyl sulphoxide, N-methylpyrrolidone, dichloroethylene, tetrachloroethylene, tetrachloroethane, tetrabromoethane, chlorobenzene, dichlorobenzene, bromobenzene, cyclohexanone, dioxane or alkylated aromatic hydrocarbons.

For some technical applications, the addition of a curing catalyst is advantageous. For example, the cured state is reached more rapidly by adding a small amount of an organic peroxide or per-salt. Compounds such as di-tert.-butyl peroxide, dilauryl peroxide, dicumyl peroxide, tert.-butyl cumyl peroxide or tert.-butyl perbenzoate, used in a concentration of 0.01–5 percent, preferably 0.25–0.5 percent, relative to the total weight of the curable mixture, are suitable for this purpose. It is however also possible to employ other, non-peroxidic curing accelerators or additives which have a favourable influence on the curing reaction.

The curable mixtures according to the invention are employed above all in the fields of surface protection, the electrical industry, laminating processes and the building industry. They can be used in a formulation suited in each case to the particular application, in the unfilled or filled state, if appropriate in the form of solutions or emulsions, as lacquers, compression moulding compositions, sintering powders, dipping resins, casting resins, injection moulding formulations, impregnating resins, binders and laminating resins.

A further subject of the invention is therefore a process for the manufacture of crosslinked, insoluble and infusible plastics products, characterised in that imides of unsaturated dicarboxylic acids of the formula I and amines of the formula II or III are reacted with one another, if appropriate in the presence of a curing catalyst, at temperatures between 100 and 280° C.

The manufacture, according to the invention, of the crosslinked, infusible products is as a rule carried out with simultaneous shaping to give mouldings, sheet-like structures, laminates or adhesive bonds. For this purpose, additives which are customary in the technology of curable plastics, such as, for example, fillers, plasticisers, pigments, dyestuffs, mould release agents or flame-retarding substances, can be added to the curable compositions. Examples of fillers which can be used are glass fibres, mica, quartz powder, kaolin, colloidal silicon dioxide or metal powders, whilst calcium stearate is an example of a mould release agent which can be used. Shaping can be effected by brief, rapid heating to, preferably, 170–250° C. under a pressure of 1–200 kp./cm.$^2$. The shaped articles thereby produced already possess sufficient mechanical strength, so that their curing can be completed outside the press in an oven at 200–280° C.

If a prepolymer is first manufactured from the curable mixtures, it can be ground to give a fine powder which can be converted into coatings by the fluidised bed process.

A solution or suspension of the prepolymer in a suitable solvent can be used for the manufacture of laminates by impregnating porous sheet-like structures such as fabrics, fibre mats or fibre fleeces, especially glass fibre mats or glass fibre fabrics, with solutions or suspensions and removing the solvent by a drying process. The further curing is carried out in a press, preferably at 170–250° C. and under 5–200 kp./cm.$^2$ pressure. It is also possible only to pre-cure the laminates in the press and to post-cure the products thus obtained in an oven at 200–280° C. until optimum use properties are attained. When manufacturing laminates, the substantially better solubility in dioxane of, for example, the tris-maleimide of tris-(4-aminophenyl)-phosphate as compared to the frequently used N,N'-4,4'-diaminodiphenylmethane-bis-maleimide, manifests itself very advantageously.

MANUFACTURE OF THE TRIS-MALEIMIDE OF TRIS-(4-AMINOPHENYL)-PHOSPHATE (a) 294 g. (3.0 mols) of maleic anhydride, dissolved in 800 ml. of dioxane, are initially introduced into a reaction vessel provided with a stirrer and thermometer. A solution of 371 g. (1 mol) of tris-(4-aminophenyl)-phosphate in 2.5 litres of dioxane is added dropwise to the above solution over the course of 4–5 hours at 10–20° C. After completion of the addition, the mixture is stirred for a further 1½ hours and the reaction product is then filtered off, washed with chloroform and dried. 669 g. of a yellowish substance of melting point 127–130° C. are obtained. According to the analytical data, this substance has the following structure:

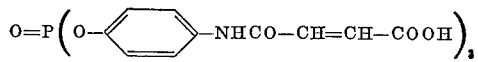

(b) 85 g. of sodium acetate and 1.1 litres of acetic anhydride are initially introduced into a reaction vessel provided with a stirrer and thermometer and are warmed to 60° C. by means of an oil bath. 954 g. of the tris-maleamic acid manufactured according to (a) are added into portions to this solution over the course of 30 minutes, in such a way that the reaction temperature does not exceed 90° C. After completion of the addition, the mixture is allowed to cool to room temperature and thereafter a mixture of 2 litres of isopropanol and 0.7 litre of water is added to the reaction product which has partly crystallised out. The substance which precipitates is filtered off, washed with isopropanol and water until free of acid, and dried. 532 g. of a substance of melting point 173.5–177° C. are obtained; according to the analytical data, this substance is the tris-maleimide of tris-(4-aminophenyl)-phosphate, having the following structural formula:

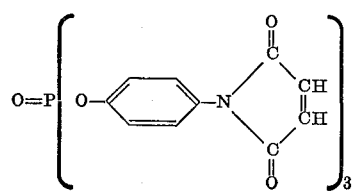

MANUFACTURE OF THE TRIS-MALEIMIDE OF TRIS-(4-AMINOPHENYL)-THIOPHOSPHATE (a) 117.6 g. (1.20 mols) of maleic anhydride dissolved in 500 ml. of chloroform are initially introduced into a reaction vessel provided with a stirrer and thermometer. A solution of 154.8 g. (0.40 mol) of tris-(4-aminophenyl)-thiophosphate in 600 ml. of dioxane is added dropwise to the above solution at room temperature over the course of 4 hours. After completion of the addition, the crystal suspension is stirred for a further 4 hours at room temperature and the solid reaction product is then filtered off, washed with chloroform and dried. 279 g. of a yellowish substance of melting point 153–156° C. are thus obtained. This has the following structure according to the analytical data:

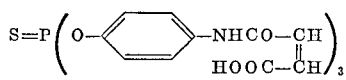

(b) 12 g. of sodium acetate are suspended in 105 ml. of acetic anhydride in a reaction vessel provided with a stirrer and thermometer, and are warmed to 90° C. 68 g. of the tris-maleamic acid manufactured according to (a) are added to the warm solution in portions over the course of 15 minutes, the temperature being 85–95° C. After completion of the addition, the mixture is stirred for a further 15 minutes at 85° C. and thereafter a mixture of 50 ml. of water and 250 ml. of isopropanol is slowly added dropwise to the suspension. The whole is left to stand overnight at room temperature and is subsequently filtered, and the residue is thoroughly washed with water and then dried. 56 g. of a substance of melting point 232–236° C. are thus obtained; according to the analytical data, the substance is the tris-maleimide of tris-(4-aminophenyl)-thiophosphate of the following formula:

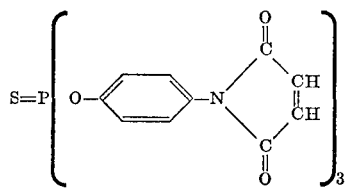

Example 1

6.11 g. (0.01 mol) of tris-maleimide of tris-(4-aminophenyl)-phosphate (hereafter referred to as "Tris-imide I") and 1.19 g. (0.006 mol) of 4,4'-diaminodiphenylmethane are well mixed. The mixture is heated to 120° C. for 1.5 hours. The substance is cooled, finely powdered and pressed for 15 minutes at 180° C. and 30 atmospheres gauge to give a film which is additionally cured for a further 4 hours at 240° C.

The point at which this film starts to soften is determined by means of thermo-mechanical analysis, using the "T MS–1" instrument of Messrs Perkin-Elmer (heating speed 10° C./minute, 20 g. load). The film according to the invention starts to soften at 374° C.

Comparison example I 3.58 g. (0.01 mol) of N,N'-4,4'-diphenylmethane-bis-maleimide and 0.79 g. (0.004 mol) of 4,4'-diaminodiphenylmethane are well mixed. The mixture is heated to 120° C. for 1.5 hours. The substance is cooled, finely powdered and pressed for 15 minutes at 180° C. and 30 atmospheres gauge to give a film which is additionally cured for a further 4 hours at 240° C. This film, manufactured according to a known method, starts to soften at 270° C. according to thermo-mechanical analysis under the same analytical conditions as in Example 1.

Example 2

100.4 g. (0.163 mol) of "Tris-imide I" and 19.6 g. (0.099 mol) of 4,4'-diaminodiphenylmethane are well mixed, fused in an oil bath at 180° C. and degassed. The melt is poured into a mould of size 150 x 150 x 4 mm. and is subsequently cured of 2 hours at 180° C. and 2 hours at 200° C. The test data of the moulding obtained are listed in Table 1.

Comparison example II 106.4 g. (0.297 mol) of N,N'-4,4'-diaminodiphenylmethane-bis-maleimide and 23.6 g. (0.119 mol) of 4,4'-diaminodiphenylmethane are well mixed, fused in an oil bath at 150° C. and degassed. The melt is poured into a mould of size 150 x 150 x 4 mm. and is subsequently cured for 1.5 hours at 140° C., 1.5 hours at 160° C., 1.5 hours at 180° C. and 1.5 hours at 200° C. The test data of this moulding produced from a known curable mixture are listed in Table 1.

Example 3

107.1 g. (0.175 mol) of "Tris-imide I" and 34.4 g. (0.174 mol) of 4,4'-diaminodiphenylmethane are well mixed, fused in an oil bath at 160° C. and degassed. The melt is poured into a mould of size 150 x 150 x 4 mm. and is subsequently cured for 3 hours at 180° C. and 3 hours at 200° C. The test data of the moulding obtained are listed in Table 1.

Example 4

107.0 g. (0.175 mol) of "Tris-imide I" and 13.0 g. (0.065 mol) of 4,4'-diaminodiphenylmethane are well mixed, fused in an oil bath at 180° C. and degassed. The melt is poured into moulds of sizes 150 x 150 x 2 mm. and 150 x 150 x 4 mm. and is subsequently cured for 4 hours at 200° C. The properties of these mouldings according to the invention are listed in Tables 1 and 2.

Example 5

116.0 g. (0.190 mol) of "Tris-imide I" and 14.0 g. (0.070 mol) of 4,4'-diaminodiphenyl-ether are well mixed, fused at 180° C. and degassed. The melt is poured into a mould of size 150 x 150 x 2 mm. and is cured as in Example 4. The properties of the mouldings according to the invention are listed in Table 2.

TABLE 1

| | Flexural strength according to VSM* 77,103 (kg./mm.²) | Impact strength according to VSM 77,105 (cm. kg./cm.²) | Heat distortion point according to ISO/R** 75 (° C.) |
|---|---|---|---|
| Example: | | | |
| 2 | 17.2 | 15.0 | 213 |
| 3 | | 17.0 | 216 |
| 4 | 14.1 | 9.1 | 224 |
| Comparison Example II*** | 11.3 | 9.9 | 224 |

*VSM=standard specifications of the Verein Schweizerischer Maschinenindustrieller.
**ISO/R=standard specifications of the International Standard Organisation/Recommendation.
***According to French Patent Specification No. 1,555,564.

TABLE 2

| | Example 4 | Example 5 |
|---|---|---|
| Dielectric loss factor tgδ according to DIN 53,483 at 23° C./50 Hz., initial value | 0.23 | 0.23 |
| After 24 hours' storage in water at 23° C | 0.30 | 0.30 |
| Dielectric constant according to DIN 53,483 at 23° C./50 Hz., initial value | 3.6 | 3.6 |
| After 24 hours' storage in water at 23° C | 3.7 | 3.7 |
| Specific volume resistance according to DIN 53,482 (Ω.cm.), initial value | 6.7×10¹⁶ | 2.4×10¹⁷ |
| After 24 hours' storage in water at 23° C | 1.4×10¹⁶ | 1.9×10¹⁶ |

Table 1 shows that the moulded materials according to the invention have substantially higher flexural strengths and impact strengths than the moulded material obtained according to the French patent specification, whilst their heat distortion point is only slightly lower. The fact that the heat distortion point of the moulding from Comparison example II is comparatively 11 to 8° C. higher, respectively, does not mean that this moulding is generally better for technical applications, since for such applications a combination of several properties which should be as good as possible is generally the decisive factor.

The moulded materials of Examples 2 and 3 are based on a tris-maleimide whilst that of Comparison example II is based on a bis-maleimide. It would therefore have been expected that Examples 2 and 3 would give more brittle mouldings because of the higher density of cross-linking; surprisingly, however, they are less brittle than the mouldings from Comparison example II.

Table 2 shows the very good electrical properties of the moulded materials according to the invention. These properties only change very slightly on 24 hours' storage in water, though the properties of polymers containing phosphate groups are frequently rather adversely influenced by storage in water.

Example 6

88.4 g. (0.144 mol) of the "Tris-imide I" and 21.6 g. (0.087 mol) of 4,4' - diaminodiphenylsulphone are dissolved in 30 ml. of hot dioxane; the solvent is stripped off in vacuo at 150° C. until a clear, bubble-free melt has been produced. This is poured into a mould of size 150 x 4 mm. and is subsequently cured for 2 hours at 160, 2 hours at 180 and 2 hours at 200° C. The resulting test specimen shows the following properties:

Flexural strength (VSM 77,103) = 10.4 kg./mm.$^2$
Impact strength (VSM 77,105) = 4.2 cm. kg./cm.$^2$
Heat distortion point (ISO/R 75) = 256° C.

Example 7

87.1 g. (0.142 mol) of the "Tris-imide I" and 22.9 g. (0.086 mol) of 4,4' - diamino - 3,3' - dichlorodiphenylmethane are fused as in Example 6, degassed, cast and cured in a rectangular frame of 1 mm. thick polytetra-properties:

Flexural strength (VSM 77,103) = 13.6 kg./mm.$^2$
Impact strength (VSM 77,105) = 10.6 cm. kg./cm.$^2$
Heat distortion point (ISO/R 74) = 215° C.

Example 8

9.05 g. of tris-maleimide of tris - (4 - aminophenyl)-thiophosphate (hereafter referred to as "Tris-imide II") and 0.95 g. of m-phenylenediamine are well mixed and cured in a rectangular frame of 1 mm. thick polytetrafluoroethylene ("Teflon") between two 1 mm. thick Teflon layers in a press at 180° C. under light pressure (less than 5 atmospheres) for 15 minutes, to give a 1 mm. thick moulding, which is additionally post-cured for 24 hours at 200° C. The properties of the moulding obtained are indicated in Tables 3 and 4.

Example 9

7.95 g. of "Tris-imide II" and 2.05 g. of 4,4'-diamino-3,3'-dichlorodiphenylmethane are mixed and cured as in Example 8 to give a moulding. The properties of the resulting moulding are indicated in Tables 3 and 4.

Example 10

9.95 g. of "Tris-imide I" and 1.05 g. of m-phenylenediamine are mixed and cured as in Example 8 to give a moulding. The properties of the resulting moulding are indicated in Tables 3 and 4.

Example 11

A mixture is prepared as in Example 10, but additionally 0.11 g. of tert.-butyl perbenzoate is added; this mixture is cured as in Example 8 to give a moulding of which the properties are indicated in Tables 3 and 4.

Example 12

6.1 g. of "Tris-imide I" and 1.02 g. of 3-aminomethyl-3,5,5-trimethylcyclohexylamine (isophoronediamine) are cured as in Example 8 to give a moulding of which the properties are indicated in Table 4.

Example 13

6.1 g. of "Tris-imide I," 0.73 g. of 1,3-di(γ-aminopropyl)-5,5-dimethylhydantion and 0.35 g. of 1,6-hexamethylenediamine are cured as in Example 8 to give a moulding of which the properties are indicated in Table 4.

Example 14

6.1 g. of "Tris-imide I," 0.41 g. of 1,3-di-(γ-aminopropyl)-5,5-dimethylhydantoin and 0.26 g. of piperazine are cured as in Example 8 to give a moulding of which the properties are indicated in Table 4.

Example 15

6.1 g. of "Tris-imide I" and 1.45 g. of 1,3-di-(γ-aminopropyl)-5,5-dimethylhydantoin are cured as in Example 8 to give a moulding of which the properties are indicated in Table 4.

Example 16

12.2 g. of "Tris-imide I" and 0.72 g. of ethylenediamine are cured as in Example 8 to give a moulding of which the properties are indicated in Table 4.

Example 17

8.40 g. of "Tris-imide II" and 1.60 g. of 4,4'-diaminodiphenylmethane are cured as in Example 8 to give a moulding of which the properties are indicated in Table 4.

Example 18

6.11 g. of "Tris-imide I" and 1.48 g. of tris-(4-aminophenyl)-phosphate are cured as in Example 8 to give a moulding of which the properties are indicated in Table 4.

The mouldings manufactured in Examples 8–18 are subjected to a thermo-mechanical and thermo-gravimetric test. The thermo-mechanical test is carried out with the "T MS–1" instrument of Messrs Perkin-Elmer at a speed of heating of 10° C./minute. The thermo-gravimetric analysis is carried out in dry air with the "Recording Vacuum Thermo-analyzer TA–1" instrument of Messrs Mettler, using a sample of 50 mg. and a speed of heating of 2° C./minute. In the thermo-gravimetric analysis, a curve of the weight of the sample as a function of the temperature is recorded "thermo-gravimetric curve") and at the same time the first derivative of this thermo-gravimetric curve ("differentiated thermo-gravimetric curve") is drawn. The temperature of maximum speed of evaporation is the point of maximum slope of the thermo-gravimetric curve; at this temperature, the differentiated thermo-gravimetric curve shows a maximum. The proportion by weight which corresponds to the zone between two minima of the differentiated thermo-gravimetric curve is described as a fraction. The results of measurements by these methods of investigation are listed in Tables 3 and 4.

TABLE 3
[Results of the thermo-mechanical analysis]

| Moulding according to Example | 8 | 9 | 10 | 11 |
|---|---|---|---|---|
| Start of softening (° C.) | 236 | 300 | 233 | 270 |

Table 3 shows that the mouldings manufactured according to the invention have a very high softening point.

TABLE 4

[Results of the thermo-gravimetric analysis]

| Moulding according to Example | Maximum speed of decomposition (° C.)—fraction | | | | | Proportion of the fractions (percent) | | | | | Weight loss, 1‰ per minute at ° C. |
|---|---|---|---|---|---|---|---|---|---|---|---|
| | 1 | 2 | 3 | 4 | 5 | 1 | 2 | 3 | 4 | 5 | |
| 8 | 120 | 350 | | 588 | 730 | 2.3 | 24.0 | | 18.0 | 55.7 | 326 |
| 9 | 85 | 340 | 545 | 720 | 930 | 1.7 | 21.7 | 16.0 | 35.6 | 25.0 | 324 |
| 10 | 100 | 360 | 512 | 640 | 725 | 2.0 | 13.2 | 43.2 | 18.4 | 23.2 | 335 |
| 11 | 100 | 346 | 528 | 648 | 720 | 2.3 | 11.6 | 45.7 | 19.7 | 20.7 | 323 |
| 12 | 150 | 325 | 518 | 650 | | 2.7 | 10.6 | 57.7 | 29.0 | | 303 |
| 13 | 135 | 336 | 538 | | 760 | 2.2 | 27.5 | 18.3 | | 52.0 | 305 |
| 14 | 130 | 340 | 540 | | 760 | 2.2 | 26.4 | 21.2 | | 50.2 | 313 |
| 15 | 135 | 330 | 460 | 560 | 780 | 1.7 | 20.7 | 10.3 | 15.4 | 51.9 | 300 |
| 16 | 120 | 323 | 432 | 572 | 761 | 1.9 | 11.4 | 15.0 | 19.5 | 52.2 | 289 |
| 17 | 100 | 345 | 432 | 560 | 738 | 1.3 | 11.4 | 11.7 | 15.7 | 59.9 | 330 |
| 18 | 125 | 332 | 435 | 575 | 721 | 0.9 | 14.3 | 12.5 | 16.8 | 55.5 | 325 |

NOTE.—Like the data indicated in Table 3, the data of Table 4 show that the mouldings manufactured according to the invention, with the exception of the moulding according to Example 16, only begin to decompose in air above 300° C., with the fractions of which the maximum speed of decomposition is at about 340° C. representing a relatively small proportion by weight.

What is claimed is:

1. A storage-stable, thermosetting composition of matter, which comprises
  (a) bis-imides or tris-imides of the general formula I

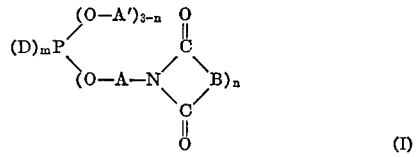

in which A and A denote aromatic radicals, aromatic radicals which are substituted by alkyl radicals with 1–4 carbon atoms, halogen atoms, the nitro group, the tertiary amino group, the alkoxy group, the carbalkoxy group or the carbamide group, or aromatic radicals which are interrupted by an oxygen atom, an alkylene group or a sulphonyl group, B denotes a radical selected from the formulae consisting of

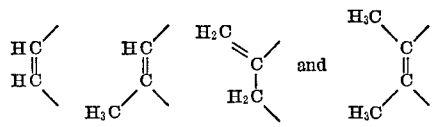

D denotes an oxygen atom or sulphur atom, $m$ denotes the number 1 or 0 and $n$ denotes the number 2 or 3,
  (b) a polyamine of the formula II or III $$E(NH_2)_n \quad (II)$$

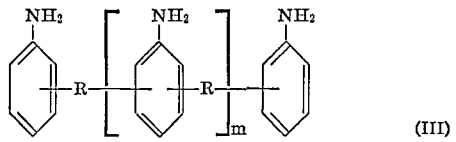

wherein, in the formula II, the radical E denotes an n-valent organic radical with 2 to 40 carbon atoms and $n$ represents an integer from 2 to 4, and wherein, in the formula III, the radicals R each denote a divalent hydrocarbon radical of an aldehyde or ketone with 1 to 8 carbon atoms resulting from removal of the oxygen atom and $m$ represents a number from 0.1 to 2, said composition containing 1 to 10 imide groups of the bis-imides or tris-imides of the formula I per primary amino group of the polyamines of the formula II or III.

2. A composition according to claim 1, which comprises (a) bis-imides or tris-imides of the formula I, in which A and A' denote identical or different aromatic radicals with 6 to 12 carbon atoms, B denotes the vinylene radical, D denotes an oxygen atom or sulphur atom, $m$ denotes 1 and $n$ denotes 3, and
  (b) di-primary or tri-primary polyamines of the formula II, wherein E denotes an organic radical with 2 to 40 carbon atoms.

3. A composition according to claim 1, wherein said composition contains 2 to 5 imide groups of the bis-imides or tris-imides of the formula I per primary amino group of the polyamines of the formula II or III.

4. A composition according to claim 1, wherein the tris-imide of formula I is a tris-maleimide of the formula

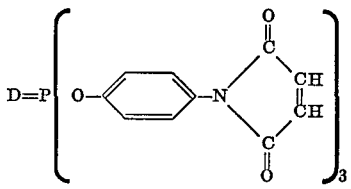

5. A composition according to claim 1, wherein the polyamine of formula II is 4,4'-diaminodiphenylmethane.

6. A composition according to claim 1, wherein the polyamine of formula II is 4,4'-diamino-3,3'-dichlorodiphenylmethane, 3 - aminomethyl-3,5,5-trimethylcyclohexylamine or 1,3 - di - (γ-aminopropyl) - 5,5 - dimethylhydantoin.

7. A composition according to claim 8, wherein the curing catalyst is tert.-butyl perbenzoate.

8. A composition according to claim 1, wherein additionally 0.01 to 5% of a curing catalyst is present by weight of the total curable mixture.

References Cited

UNITED STATES PATENTS

| | | | |
|---|---|---|---|
| 3,625,912 | 12/1971 | Vincent et al. | 260—30.2 |
| 3,642,712 | 2/1972 | Sambeth et al. | 260—78 UA |
| 3,658,764 | 4/1972 | Bargain et al. | 260—78 UA |
| 3,669,930 | 6/1972 | Asahara et al. | 260—47 CZ |
| 3,679,639 | 7/1972 | Bargain et al. | 260—78 U |
| 3,740,378 | 6/1973 | Crivello | 260—78 UA |

LESTER L. LEE, Primary Examiner

U.S. Cl. X.R.

117—124 E, 126 GR, 161 P; 161—227; 260—37 N, 47 CZ, 78 UA